(12) United States Patent
Wong et al.

(10) Patent No.: US 9,490,695 B1
(45) Date of Patent: Nov. 8, 2016

(54) METHOD AND APPARATUS FOR ELIMINATING SHIMMERING

(71) Applicant: MARVELL INTERNATIONAL LTD., Hamilton (BM)

(72) Inventors: Sai Bun Wong, Tai Kok Tsui (HK); Lionel Barrow, Oakland, CA (US); Sofjan Goenawan, Cupertino, CA (US); Gary Chen, Sunnyvale, CA (US); Jerry Su, Milpitas, CA (US); Wanfeng Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 123 days.

(21) Appl. No.: 14/016,869

(22) Filed: Sep. 3, 2013

Related U.S. Application Data

(60) Provisional application No. 61/697,417, filed on Sep. 6, 2012.

(51) Int. Cl.
*G05F 1/00* (2006.01)
*G05F 1/577* (2006.01)
*H02M 3/02* (2006.01)

(52) U.S. Cl.
CPC ..................................... *H02M 3/02* (2013.01)

(58) Field of Classification Search
CPC ......... H02M 3/33507; H02M 3/3378; H02M 7/5395; H02M 3/33523; H02M 3/02
USPC ............... 323/241, 267, 268, 283, 322, 350; 363/21.1, 21.11, 21.18, 26, 41, 21.05, 363/21.13, 65, 67, 69
See application file for complete search history.

(56) References Cited

U.S. PATENT DOCUMENTS

| | | | |
|---|---|---|---|
| 6,300,723 B1 * | 10/2001 | Wang et al. ................... | 315/247 |
| 6,385,067 B2 * | 5/2002 | Galbiati ............ | H02M 7/53873 363/132 |
| 6,456,083 B1 * | 9/2002 | Thakkar .................. | B60T 8/885 324/500 |
| 7,456,620 B2 * | 11/2008 | Maksimovic et al. ........ | 323/283 |
| 2012/0286745 A1 * | 11/2012 | Lin et al. ....................... | 323/205 |
| 2013/0328520 A1 * | 12/2013 | Chen et al. .................... | 320/107 |

* cited by examiner

*Primary Examiner* — Adolf Berhane
*Assistant Examiner* — Alex Torres-Rivera

(57) ABSTRACT

Aspects of the disclosure provide a circuit that includes a switch control circuit and a timing control circuit. The switch control circuit is configured to enable/disable a pulse width modulation (PWM) switch control to a regulator to transfer power to a load. The timing control circuit is configured to enable an analog to digital converter (ADC) to convert an analog signal to a digital stream when the PWM switch control is disabled in order to reduce noise in the digital stream due to switching activities in the regulator.

18 Claims, 5 Drawing Sheets

METHOD AND APPARATUS FOR ELIMINATING SHIMMERING

INCORPORATION BY REFERENCE

This present disclosure claims the benefit of U.S. Provisional Application No. 61/697,417, "METHOD FOR ELIMINATING LIGHT SHIMMERING IN LED DRIVERS FOR THE ANALOG DIMMING INPUT INTERFACE" filed on Sep. 6, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Light emitting diode (LED) lighting devices provide the advantages of low power consumption and long service life. Thus, LED lighting devices may be used as general lighting equipment to replace, for example, fluorescent lamps, bulbs, halogen lamps, and the like.

SUMMARY

Aspects of the disclosure provide a circuit that includes a switch control circuit and a timing control circuit. The switch control circuit is configured to enable/disable a pulse width modulation (PWM) switch control to a regulator to transfer power to a load. The timing control circuit is configured to enable an analog to digital converter (ADC) to convert an analog signal to a digital stream when the PWM switch control is disabled in order to reduce noise in the digital stream due to switching activities in the regulator.

In an embodiment, the switch control circuit is configured to generate a control signal with a duty cycle determined according to a digital value in the digital stream and to use the control signal to enable/disable the PWM switch control. Further, in an example, the switch control circuit is configured to generate the control signal with the duty cycle determined according an average of a plurality of digital values in the digital stream.

According to an aspect of the disclosure, the switch control circuit includes a duty cycle determination module configured to determine the duty cycle according to a dimming control value, and a noise rejection signal configured to reject a new digital value when a difference of the new digital value to the dimming control value is within a range.

Further, in an example, the switch control circuit includes an averaging module configured to average a plurality of digital values not being rejected to calculate a new dimming control value.

According to an aspect of the disclosure, the PWM switch control is a first PWM switch control, the regulator is a first regulator, the load is a first load, the switch control circuit is further configured to enable/disable a second PWM switch control to a second regulator to transfer power to a second load, and the timing control circuit is configured to enable the ADC to convert the analog signal to the digital stream when the first PWM switch control and the second PWM switch control are disabled in order to reduce noise in the digital stream due to the switching activities in the first regulator and the second regulator.

In an embodiment, the switch control circuit is configured to generate a first control signal with a first duty cycle to enable/disable the first PWM switch control and a second control signal with a second duty cycle to enable/disable the second switch control, and the first duty cycle and the second duty cycle are determined according to a digital value in the digital stream. In an example, the switch control circuit is configured to generate the first control signal and the second control signal with at least a pair of aligned transition edges.

Aspects of the disclosure provide a method. The method includes enabling a PWM switch control to a regulator to transfer power to a load, disabling the PWM switch control to the regulator periodically, and converting an analog signal to a digital stream when the PWM switch control is disabled in order to reduce noise in the digital stream due to switching activities in the regulator.

Aspects of the disclosure provide an apparatus that includes a regulator, a switch control circuit, and a timing control circuit. The regulator is configured to transfer power to a load when a PWM switch control to the regulator is enabled. The switch control circuit is configured to enable/disable the PWM switch control to the regulator. The timing control circuit is configured to enable an analog to digital converter (ADC) to convert an analog signal to a digital stream when the PWM switch control is disabled in order to reduce noise in the digital stream due to switching activities in the regulator.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
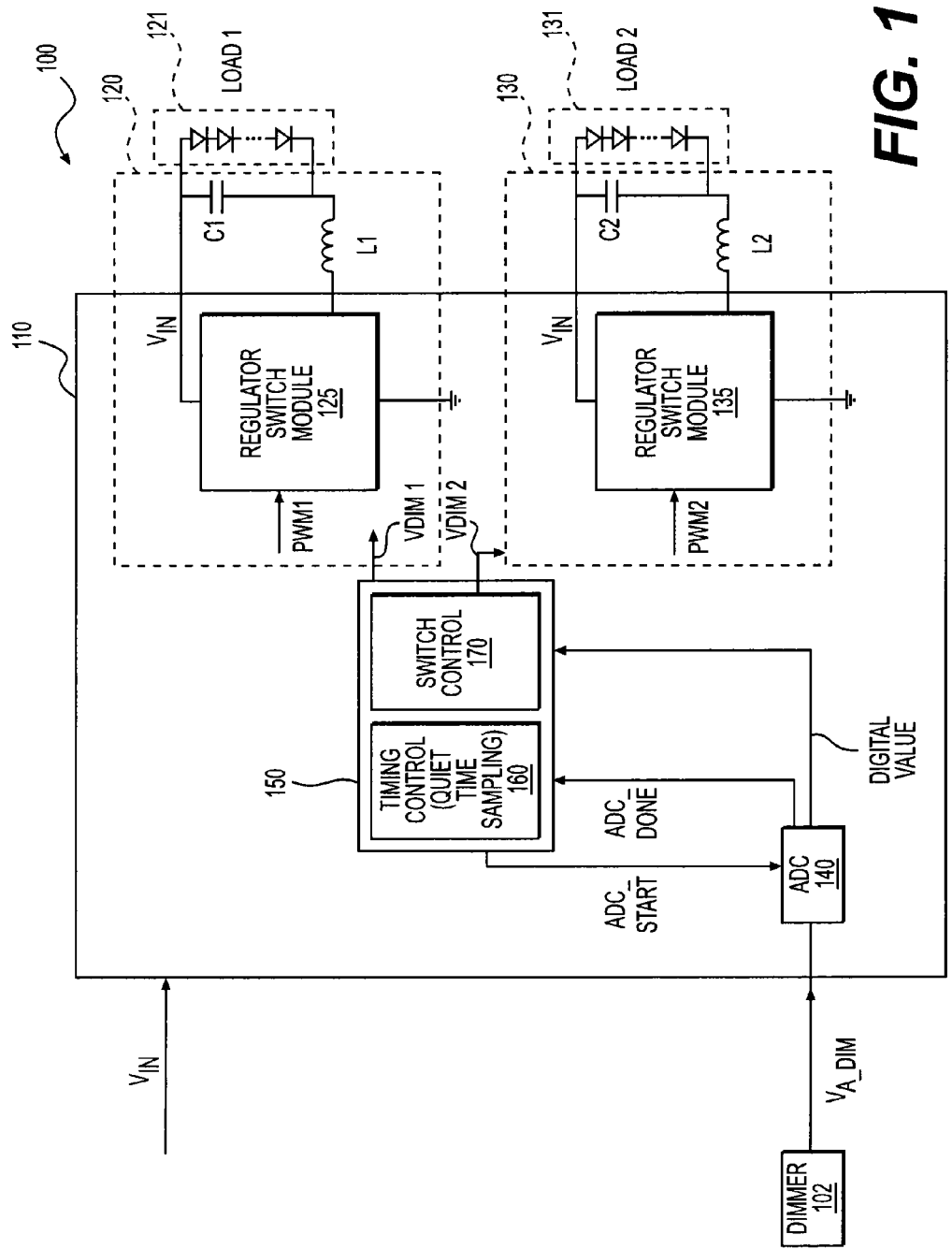
FIG. 1 shows a block diagram of an electronic system 100 according to an embodiment of the disclosure.

FIG. 1 shows a block diagram of an electronic system 100 according to an embodiment of the disclosure. The electronic system 100 drives load devices under a control of a dimmer 102. In an embodiment, the dimmer 102 is analog-adjustable that generates an analog dimming signal indicative of a dimming level within a range, such as from 0% to 100% of a full driving power. The electronic system 100 includes an analog-to-digital converter (ADC) 140 configured to convert the analog dimming signal to a digital value. The electronic system 100 then uses digital signal processing techniques to process the digital value, and drives the load devices accordingly. The electronic system 100 is configured to stably drive the load devices, and avoid hurting user experience due to noise in the digital value.

According to an aspect of the disclosure, the electronic system 100 is a light emitting diode (LED) lighting system that drives light emitting diodes. In the FIG. 1 example, the electronic system 100 respectively drives a first load 121 formed of a first plurality of serially connected LEDs, and a second load 131 formed of a second plurality of serially connected LEDs. In an example, the electronic system 100 adjusts power respectively provided to the first load 121 and the second load 131 in response to the analog dimming signal in order to adjust respective light intensities emitted by the first plurality of LEDs and the second plurality of LEDs. The first plurality of LEDs and the second plurality of LEDs emit light of the same color or different colors. It is noted that the electronic system 100 can be suitably modified to drive a single load, or more than two loads.

Specifically, in the FIG. 1 example, the electronic system 100 includes the dimmer 102, the ADC 140, a control circuit 150, a first regulator 120, a second regulator 130, the first load 121 and the second load 131. These elements are coupled together as shown in FIG. 1.

The dimmer 102 can be any suitable dimmer that outputs an analog signal indicative of a dimming level. In an embodiment, the dimmer 102 is a wall dimmer that is pre-installed in the wall. In an example, the dimmer 102 outputs a voltage $V_{A\_DIM}$ indicative of the dimming level. For example, the voltage $V_{A\_DIM}$ is adjustable from 100 mV to 1 V, and a voltage level in the range of [100 mV, 1 V] is indicative of a dimming level in the range of [0%, 100%] with 100 mV being indicative of 0% and 1 V being indicative of 100%.

The ADC 140 starts an analog-to-digital conversion in response to an ADC control signal ADC_START. In an example, in response to a rising edge of the ADC_START signal, the ADC 140 samples the voltage $V_{A\_DIM}$ and converts the sampled voltage into a digital value. When the analog-to-digital conversion is done, the ADC 140 outputs an ADC_DONE signal indicative of a conversion success and also outputs the digital value.

According to an aspect of the disclosure, the digital value can be affected by noise from various sources, such as noise in power supply, noise coupled to the ADC 140 from other circuits, noise due to ADC itself, and the like. In an embodiment, the ADC 140 is a 10-bit ADC. The noise floor (root mean square noise) of the ADC 140 is less than one least significant bit (LSB) and peak to peak noise can cause one to two LSB changes during operation. When the dimming level is relatively high, such as higher than 30%, and the like, the one to two LSB changes result in less than 1% control signal change (e.g., duty cycle change), and thus have little impact on the user experience, for example, no observable flicking or shimmering; and when the dimming level is relatively low, such as 5%, the one to two LSB changes may result in 6% control signal change (e.g., duty cycle change), cause observable flickering and shimmering in the light emitted by the LEDs, and affect user experience.

The first regulator 120 is coupled to the first load 121 and the control circuit 150 to drive the first load 121 under the control by the control circuit 150. In the FIG. 1 example, the first regulator 120 includes a capacitor C1, an inductor L1 and a regulator switch module 125. These elements are coupled together as shown in FIG. 1. In an example, the regulator switch module 125 includes a set of switches (not shown), and logic circuits (not shown) to generate switch control signals for the set of switches in response to signals from the control circuit 150. In an example, the control circuit 150 provides a first pulse width modulation (PWM) signal PWM1 and a first control signal VDIM1 to the regulator switch module 125. The logic circuits in the regulator switch module 125 generate the switch control signals for the set of switches based on the PWM1 signal.

Then, the set of switches are under a PWM switch control to provide a power to the first load 121. The first control signal VDIM1 is configured to enable or disable the PWM switch control. In an embodiment, the first control signal VDIM1 is a periodic signal, and the duty cycle of the first control signal VDIM1 is adjusted to regulate the provided power to the first load 121.

According to an embodiment of the disclosure, the set of switches can be implemented using transistors, such as metal-oxide-semiconductor field effect transistors (MOSFET), and the like. In an example, when the first control signal VDIM1 is logic "1", the PWM switch control is enabled. The PWM1 includes pulses having a relatively high frequency, such as in the order of 100 KHz and the like. The logic circuits in the regulator switch module 125 generate the switch control signals to control the transistors. In an embodiment, an inductor current flowing through the inductor L1 is monitored, and the control circuit 150 adjusts the pulse width in the PWM1 to regulate the inductor current between a predefined peak limit and a predefined valley limit. Thus, in an example, the average inductor current is the average of the predefined peak limit and the predefined valley limit when the first control signal VDIM1 is logic "1". When the first control signal VDIM1 is logic "0", the PWM switch control is disabled, and the inductor current is zero.

In an embodiment, the first control signal VDIM1 is a periodic signal having a relatively low frequency, such as in the order of 1 KHz, and the like. By adjusting a duty cycle of the first control signal VDIM1, the control circuit 150 controls the power provided to the first load 121, and thus controls the light intensity emitted by the first plurality of LEDs.

The second regulator 130 operates similarly to the first regulator 120 described above. The second regulator 130 also utilizes certain components that are identical or equivalent to those used in the first regulator 120; the description of these components has been provided above and will be omitted here for clarity purposes.

Similarly, the control circuit 150 provides a second control signal VDIM2 to enable/disable PWM switch control by a second PWM signal PWM2 to switches in the regulator switch module 135 to provide a power to the second load 131. It is noted that the control circuit 150 can respectively adjust the duty cycles of the first control signal VDIM1 and the second control signal VDIM2 to respectively adjust the power provided to the first load 121 and the second load 131.

In an embodiment, the control circuit 150 synchronizes the first control signal VDIM1 and the second control signal VDIM2, for example to have the same frequency. Further, in an example, the control circuit 150 aligns the rising edges of the first control signal VDIM1 and the second control signal VDIM2 to enable the PWM switch control to the first regulator 120 and the second regulator 130 at the same time, and respectively adjusts the falling edge timings of the first control signal VDIM1 and the second control signal VDIM2 to respectively adjust the duty cycle.

It is noted that the control circuit 150 can control the first control signal VDIM1 and the second control signal VDIM2 differently from the above configuration. In an embodiment, the control circuit 150 provides the first control signal VDIM1 and the second control signal VDIM2 with different frequencies. In another embodiment, the control circuit 150 does not align the rising edges of the first control signal VDIM1 and the second control signal VDIM2, but aligns the falling edges.

In the FIG. 1 example, the control circuit 150 includes a timing control module 160 and a switch control module 170.

The timing control module 160 is configured to control the ADC 140 operation time duration to avoid the switching activities in the regulator switch modules 125 and 135. In an example, the ADC 140 and the regulator switch modules 125 and 135 are integrated on the same integrated circuit (IC) chip. The switching activities in the regulator switch modules 125 and 135 may affect the ADC 140 operation, and cause additional noise in the digital value output from the ADC 140. Thus, when the ADC 140 operates in a time duration that the switches in the regulator switch modules 125 and 135 do not switch, the digital value output from the ADC 140 can have reduced noise level.

Specifically, in an embodiment, the control circuit 150 is configured to synchronize the ADC control signal ADC_START with the first and second control signals VDIM1 and VDIM2, and enable the ADC 140 to operate when the first and second regulators 120 and 130 are disabled. In an example, when both the first and second control signals VDIM1 and VDIM2 are logic "0", the timing control module 160 causes the ADC control signal ADC_START to change from logic "0" to logic "1" to enable the ADC 140. The ADC 140 then samples the voltage $V_{A\_DIM}$ and converts the sampled voltage into the digital value. Further, when the timing control module 160 receives the ADC_DONE indicative of conversion success, the switch control module 170 allows the first and the second control signals VDIM1 and VDIM2 to switch from logic "0" to logic "1" in an example.

The switch control module 170 uses various digital processing techniques to further reduce noise level in the digital value, and to generate the first and second control signals VDIM1 and VDIM2 with reduced noise influence, such that at low dimming level (e.g. less than 10%) the LEDs emit light without flickering or shimmering that affects user experience.

In an implementation example, the ADC 140, the control circuit 150, the first regulator switch module 125 and the second regulator switch module 135 are integrated on an IC chip 110. The IC chip 110 and the external components, such as the capacitors C1 and C2, the inductors, L1 and L2, the LED chains 121 and 131 are assembled together into a lighting device to replace a fluorescent lamp, a bulb, a halogen lamp, and the like.

It is noted that electronic system 100 can be implemented using other suitable techniques. In an example, the ADC 140 is implemented on a different IC chip. In another example, the first regulator switch module 125 and the second regulator switch module 135 are implemented on a different IC chip.

It is also noted that the regulators 120 and 130 can have any suitable architecture. In an example, the regulators 120 and 130 are configured to be buck regulators. In another example, the regulators 120 and 130 are configured to be boost regulators. In another example, the regulators 120 and 130 are configured to be buck-boost regulators. Further, in the FIG. 1 example, a load (e.g., the first load 121) is connected between an inductor (e.g., L1) and supply voltage $V_{IN}$. In another example, the load is connected between the inductor and ground.

In the FIG. 1 example, the electronic system 100 includes two regulators to respectively drive two loads 121 and 131. The electronic system 100 can be suitably modified to have one regulator to drive a single load or more than two regulators to drive more than two loads.

It is also noted that the voltage $V_{A\_DIM}$ can be generated by other suitable circuits. In an embodiment, the voltage $V_{A\_DIM}$ is generated by a temperature sensing circuit and the voltage $V_{A\_DIM}$ changes with temperature. In an example, the temperature sensing circuit is external to the IC chip 110. In another example, the temperature sensing circuit is on the IC chip 110.

Figure 2:
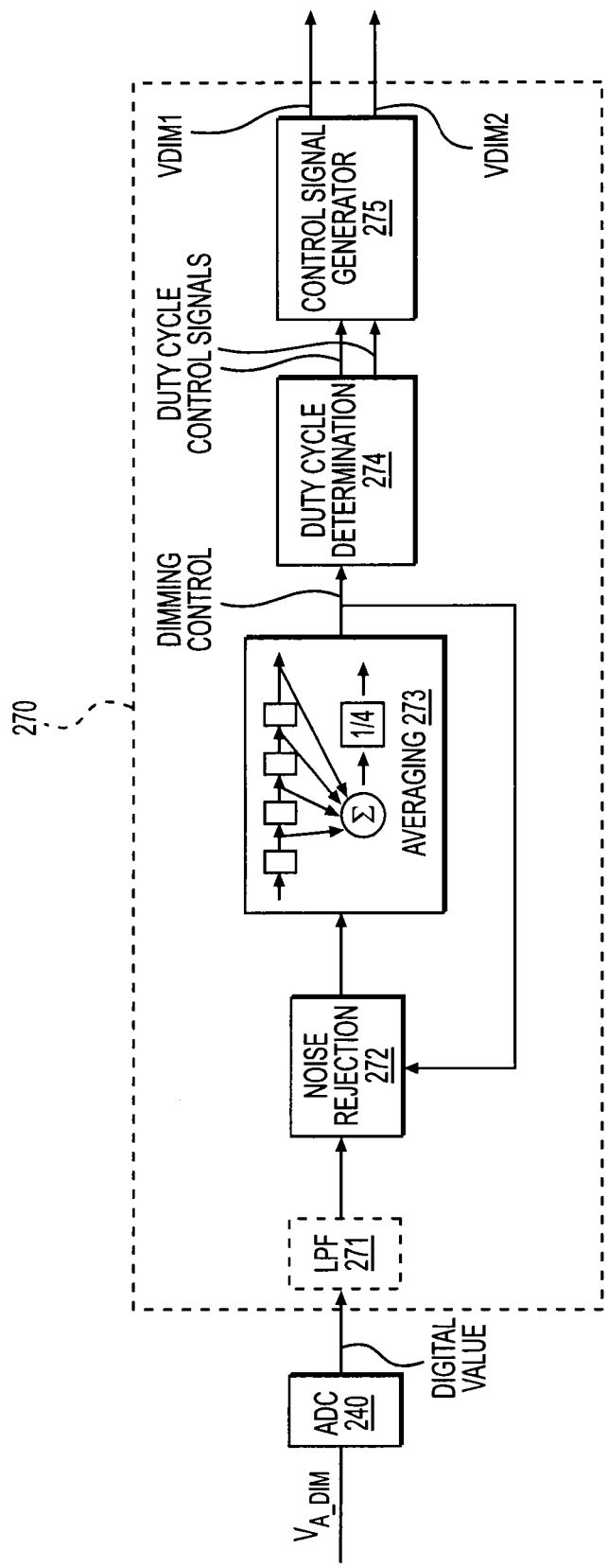
FIG. 2 shows a block diagram of a switch control module 270 according to an embodiment of the disclosure.

FIG. 2 shows a detailed block diagram of a switch control module example 270 according to an embodiment of the disclosure. In an example, the switch control module 270 is used in the electronic system 100 as the switch control module 170. The switch control module 270 includes a low pass filter (LPF) 271, a noise rejection module 272, an averaging module 273, a duty cycle determination module 274, and a control signal generator 275. These elements are coupled together as shown in FIG. 2.

In the FIG. 2 example, the switch control module 270 is coupled to an analog-to-digital converter (ADC) 240. The ADC 240 is configured to periodically sample a voltage signal $V_{A\_DIM}$, and convert the sampled voltages into a stream of digital values. The switch control module 270 generates two control signals VDIM1 and VDIM2, and adjusts duty cycles of the two control signals VDIM1 and VDIM2 based on the digital values. In an example, the two control signals are used to enable/disable switching activities in regulators, such as the regulators 120 and 130 in FIG. 1. Thus, the duty cycle adjustments of the control signals VDIM1 and VDIM2 adjust the driven power from the regulators.

In an example, the ADC 240 is a 10-bit ADC and has a noise floor less than one LSB, thus peak to peak noise in the digital values can cause one to two LSB changes in a control word, such as a 10-bit duty cycle control word that controls a duty cycle of one of the two control signals VDIM1 and VDIM2.

The low pass filter 271 is configured to remove high frequency noise in the digital values. In an example, a power supply used in the ADC 240 includes high frequency components, and causes the digital values to be affected by the high frequency components. The low pass filter 271 reduces the high frequency components in the digital values. Further, in an example, the low pass filter 271 is configured to have a transfer function with zeros at line frequency of the power supply (e.g., 50 Hz, 60 Hz), and at multiples of the line frequency. Then, the low pass filter 271 rejects line frequency noise components in the voltage signal $V_{A\_DIM}$. It is noted that, in another example, the low pass filter 271 is not needed.

The noise rejection module 272 and the averaging module 273 are coupled together to generate a dimming control signal that is stable in response to the noise in the digital values.

The averaging module 273 averages a plurality of buffered digital values to generate the dimming control signal. In the FIG. 2 example, the averaging module 273 includes a register chain formed of four serially connected registers, a sum unit configured to sum the values in the four registers, and a dividing unit configured to divide the sum by four to calculate an average of the values in the four registers. The average is output as the dimming control signal. It is noted that the averaging module 273 can be suitably modified to calculate an average of any suitable number of digital values.

The noise rejection module 272 is configured to receive a new digital value, compare the new digital value to the current dimming control signal. When the new digital value is within a range of the current dimming control signal, the new digital value is not provided to the averaging module 273 to update the dimming control signal. Thus, the dimming control signal remains the same and the difference between the new digital value and the current dimming control signal is considered as noise. In an example, the range is related to the noise floor. For example, when the noise floor is one LSB, the range is determined to be within ±3 of the current dimming control signal.

When the new digital value is out of the range of the current dimming control signal, the new digital value is provided to the averaging module 273. Accordingly, the averaging module 273 shifts in the new digital value, and calculates new sum and new average to update the dimming control signal.

Thus, when the new digital value varies due to noise, the dimming control signal is stable. When the change in the new digital value is larger than the peak-to-peak noise, the dimming control signal is updated.

The duty cycle determination module 274 receives the dimming control signal and generates duty cycle control signals to respectively control duty cycles of the two control signals VDIM1 and VDIM2. In an embodiment, the two control signals VDIM1 and VDIM2 respectively enable/disable two regulators that respectively drive two LED chains, such as shown in FIG. 1 example.

In an embodiment, based on the dimming control signal, the duty cycle determination module 274 determines respective duty cycle control words for controlling the duty cycles of the two control signals VDIM1 and VDIM2.

The control signal generator 275 is configured to generate the two control signals VDIM1 and VDIM2 according to the duty cycle control words. In an embodiment, the control signal generator 275 is configured to use the same frequency, such as 1 KHz, for both of the control signals VDIM1 and VDIM2. Further, in an example, the control signal generator 275 is configured to enable or disable the two regulators at the same time. In an example, the control signal generator 275 aligns rising edges in the controls signals VDIM1 and VDIM2 to enable the regulators at the same time.

The switch control module 270 can be implemented using any suitable techniques. In an example, the switch control module 270 is implemented using hardware, such as processing circuits. In another example, the switch control module 270 is implemented as software instructions executed by a processor.

Figure 3:
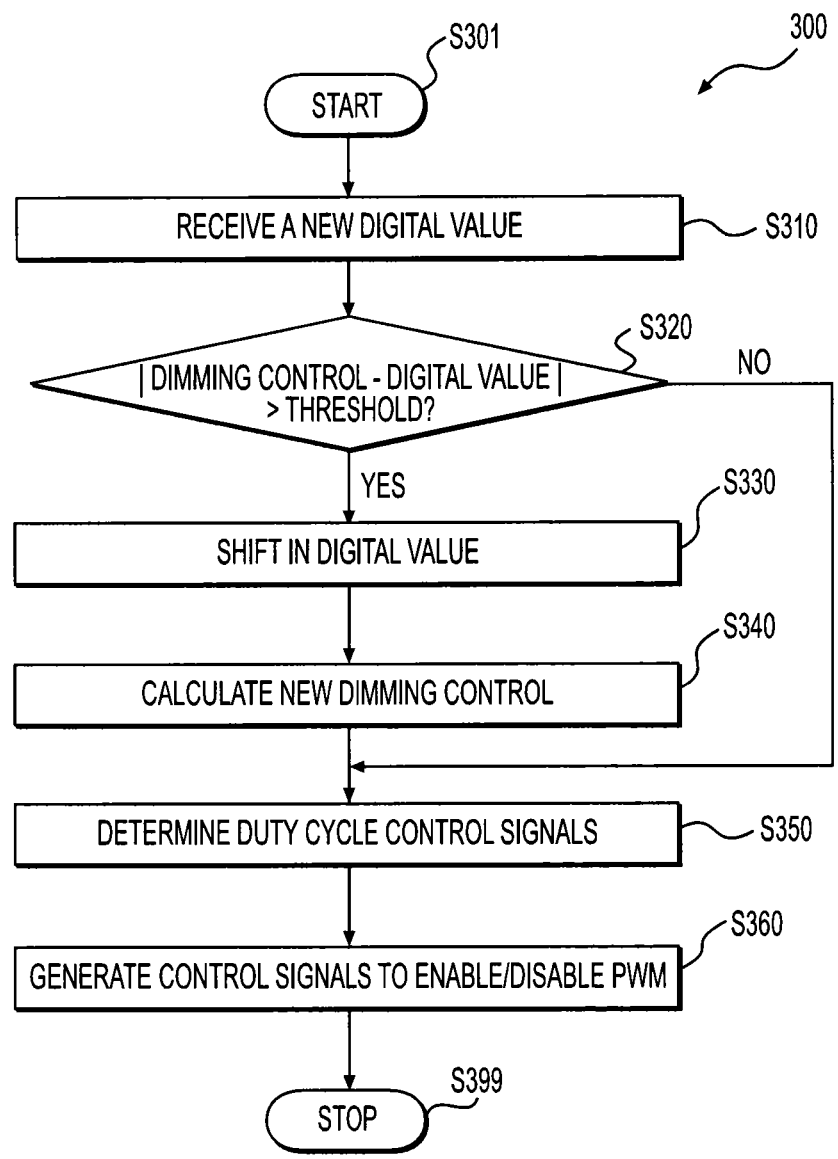
FIG. 3 shows a flow chart outlining a process 300 according to an embodiment of the disclosure.

FIG. 3 shows a flowchart outlining a process 300 for noise rejection according to an embodiment of the disclosure. The process 300 is executed in a switch control module, such as the switch control module 170, the switch control module 270, and the like. The process starts at S301, and proceeds to S310.

At S310, a new digital value is received. In an embodiment, in response to a rising edge in the ADC_START signal, the ADC 140 samples the voltage $V_{A\_DIM}$ and converts the sampled voltage to a new digital value. The ADC 140 then outputs a rising edge in the ADC_DONE signal indicative of the conversion success, and provides the new digital value to the switch control module 170.

At 320, the new digital value is compared to a present value of dimming control signal. In an example, the noise rejection module 272 compares the new digital value to the present value of the dimming control signal. When the new digital value is out of a range of the present value of the dimming control signal, for example, when the absolute value of difference between the new digital value and the present value of the dimming control signal is larger than a threshold, the process proceeds to S330 to update the dimming control signal; otherwise, the dimming control signal maintains its value, and the process proceeds to S350.

At S330, the new digital value is shift in a register. In an example, the averaging module 273 receives the new digital value, and shifts the new digital value into the register chain.

At S340, a new value of the dimming control signal is calculated. In an example, the averaging module 273 sums the values in the register chain and divides the sum by the number of values in the register chain to calculate a new average as the new value of the dimming control signal.

At S350, duty cycle control signals are determined. In an example, the duty cycle determination module 274 determines the duty cycle control words respectively for the two control signals VDIM1 and VDIM2 based on the dimming control signal.

At S360, the controls signals to enable/disable PWM controls are generated according to the duty cycle control signals. In an example, the control signal generator 275 generates the two control signals VDIM1 and VDIM2, and adjusts the duty cycles of the two control signals according to the duty cycle control signals. Then control signals VDIM1 and VDIM2 are used to enable/disable PWM switch-control to regulators, in an example. For example, when the control signal VDIM1 is logic "1", a regulator, such as the regulator 120, is enabled to be PWM switch-controlled by the PWM1 signal; and when the control signal VDIM1 is logic "0", the PWM switch-control of the regulator 120 is disabled. Then the process proceeds to S399 and terminates.

Figure 4:
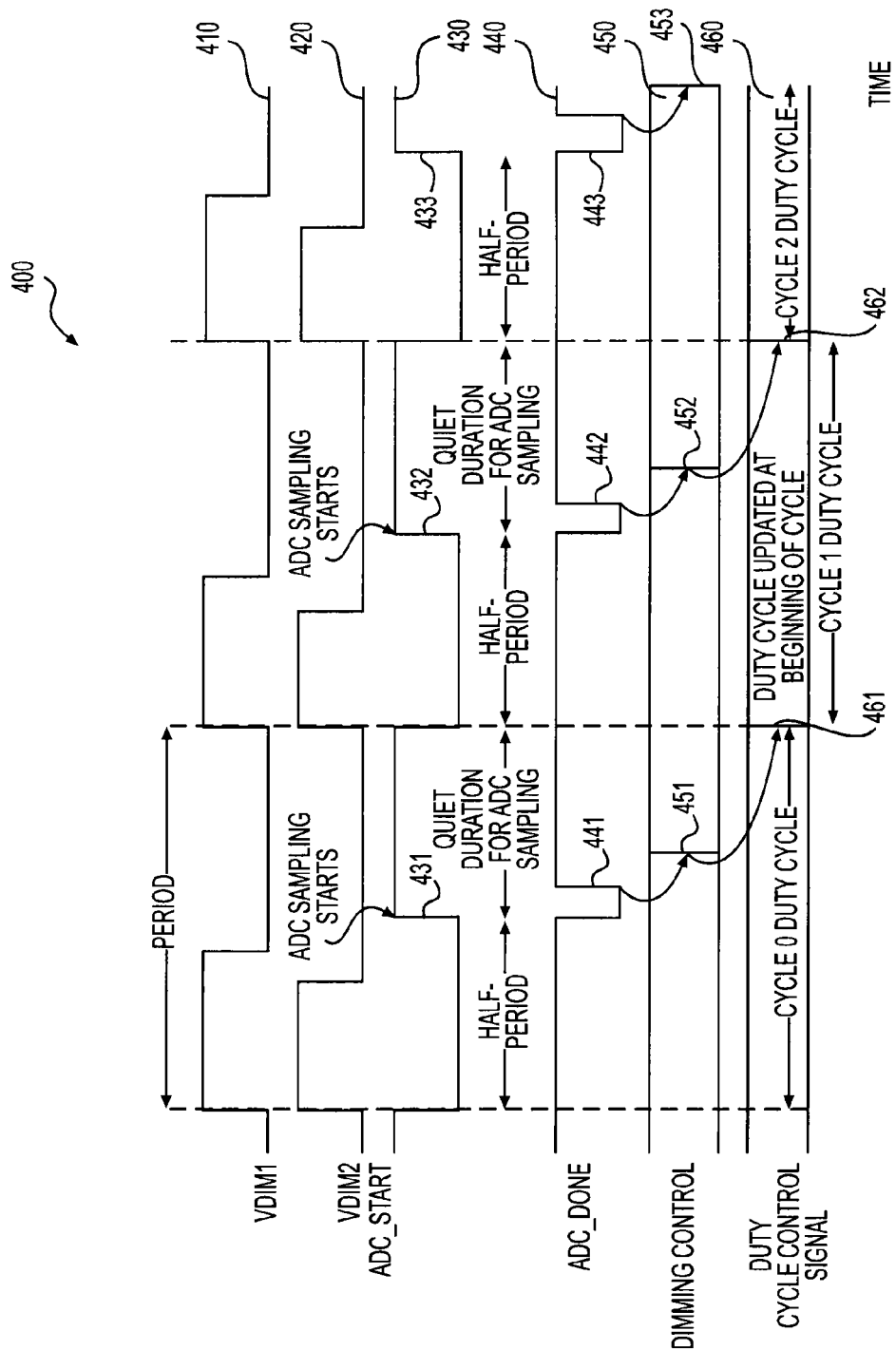
FIG. 4 shows a plot 400 of waveforms according to an embodiment of the disclosure.

FIG. 4 shows a plot 400 of waveforms according to an embodiment of the disclosure. The plot 400 includes a first waveform 410 for the control signal VDIM1, a second waveform 420 for the control signal VDIM2, a third waveform 430 for the ADC control signal ADC_START, a forth waveform 440 for the ADC output signal ADC_DONE, a fifth waveform 450 for the dimming control signal, and a sixth waveform 460 for one of the duty cycle control signals.

In the FIG. 4 example, the control signals VDIM1 and VDIM2 have the same frequency (or period), and rising edges for the two control signals in each period are aligned.

Further, in the FIG. 4 example, the rising edges 431-433 of the ADC control signal ADC_START are at half period when both of the control signals VDIM1 and VDIM2 are logic "0". In an example, when the control signals VDIM1 and VDIM2 are logic "0", regulators, such as the regulators 120 and 130 in the FIG. 1 example, are disabled of PWM switch-control, and the electronic system 100 is relatively quiet. In response to the rising edges 431-433, in an example, the ADC 140 samples the voltage $V_{A\_DIM}$ and converts the sampled voltage into a stream of digital values.

Further, when the ADC 140 finishes the conversion, the ADC 140 outputs rising edges in the ADC_DONE, as shown by 441-443.

In an embodiment, in response to the rising edge in the ADC_DONE, a switch control module, such as the switch control module 270, uses digital signal processing techniques to generate the dimming control signal (dimming control word) that does not vary when variations in the digital stream are due to noise (e.g., not real dimming adjustment). When the variations in the digital stream are due to real dimming adjustment, the dimming control signal is then updated, such as shown by 451-453. Accordingly, the duty cycle control signals are updated at the beginning of the next cycle, as shown by 461 and 462. Thus, the duty cycles of the controls signals VDIM1 and VDIM2 change in the next cycle.

Figure 5:
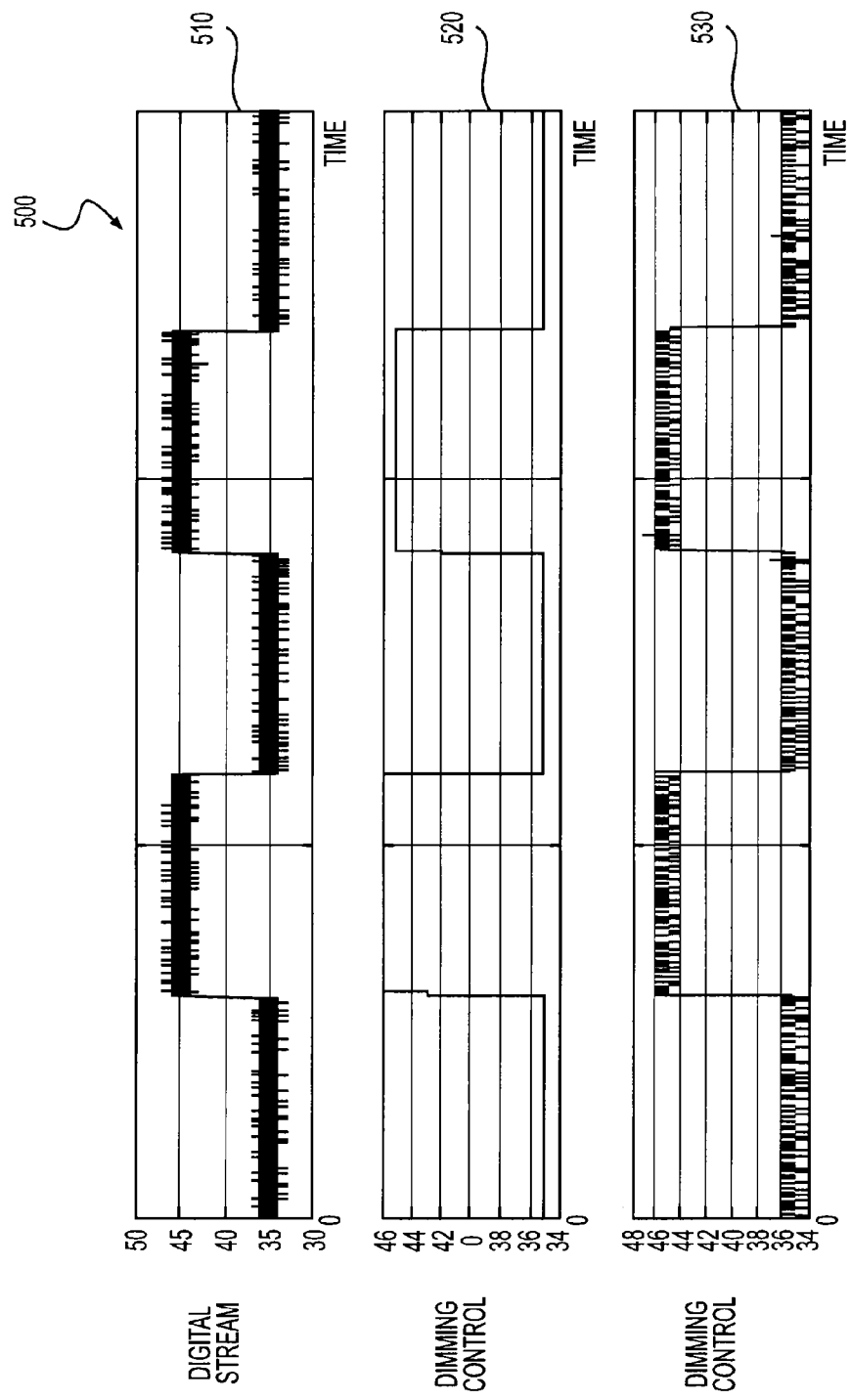
FIG. 5 shows a plot 500 of simulation waveforms according to an embodiment of the disclosure.

FIG. 5 shows a plot 500 of simulation waveforms according to an embodiment of the disclosure. The plot 500 shows a first waveform 510 of a digital stream output from an ADC, such as the ADC 240, a second waveform 520 of the dimming control signal when the noise rejection module 272 is enabled, and a third waveform 530 of the dimming control signal when the noise rejection module 272 is disabled.

Digital values in the digital stream change due to dimming adjustment and noise. The noise causes the LSB or the two LSBs in the digital value to change. The dimming adjustment generally causes much larger change in the digital stream.

When the noise rejection module 272 is enabled, the dimming control signal changes with the dimming adjustment, and does not change due to noise, as shown by the second waveform 520. In an example, a lighting system implemented according to the disclosure does not have flicking or shimmering when the dimming level is below 10%, even at 1%.

When the noise rejection module 272 is disabled, the dimming control signal still has noise leftover. As shown by the third waveform 530, the dimming control signal changes with the dimming adjustment and still has noise leftover.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit, comprising:
   a switch control circuit configured to provide a control signal to enable/disable a first pulse width modulation (PWM) signal for driving a first regulator to transfer power to a first load and to enable/disable a second PWM signal to a second regulator to transfer power to a second load; and
   a timing control circuit configured to disable an analog to digital converter (ADC) from converting an analog signal to a digital stream in response to the switch control circuit enabling the first PWM signal and the second PWM signal, and to enable the ADC to convert the analog signal to the digital stream when the first PWM signal and the second PWM signal are disabled in order to reduce noise in the digital stream due to switching activities in the first regulator and the second regulator.

2. The integrated circuit of claim 1, wherein the switch control circuit is configured to generate the control signal with a duty cycle determined according to a digital value in the digital stream and to use the control signal to enable/disable the first and second PWM signals.

3. The integrated circuit of claim 2, wherein the switch control circuit is configured to generate the control signal with the duty cycle determined according to an average of a plurality of digital values in the digital stream.

4. The integrated circuit of claim 2, wherein the switch control circuit comprises:
   a duty cycle determination module configured to determine the duty cycle according to a control value; and
   a noise rejection module configured to reject a new digital value when a difference of the new digital value to the control value is within a range.

5. The integrated circuit of claim 4, wherein the switch control circuit further comprises:
   an averaging module configured to average a plurality of digital values not being rejected to calculate a new control value.

6. The integrated circuit of claim 1, wherein the switch control circuit is configured to generate a first control signal with a first duty cycle to enable/disable the first PWM signal and a second control signal with a second duty cycle to enable/disable the second PWM signal, and the first duty cycle and the second duty cycle are determined according to a digital value in the digital stream.

7. The integrated circuit of claim 6, wherein the switch control circuit is configured to generate the first control signal and the second control signal with at least a pair of aligned transition edges.

8. A method, comprising:
   enabling first pulse width modulation (PWM) signal that drives a first regulator that transfers power to a first load and enabling a second PWM signal to a second regulator to transfer power to a second load;
   disabling the first PWM signal to the first regulator periodically and disabling the second PWM signal to the second regulator periodically; and
   converting an analog signal to a digital stream in response to disabling of the first and second PWM signals in order to reduce noise in the digital stream due to switching activities in the first regulator and the second regulator.

9. The method of claim 8, further comprising:
   generating a control signal with a duty cycle determined according to a digital value in the digital stream; and
   using the control signal to enable/disable the first and second PWM switch signals.

10. The method of claim 9, further comprising:
    computing an average of a plurality of digital values in the digital stream; and
    generating the control signal with the duty cycle determined according to the average.

11. The method of claim 9, further comprising:
    rejecting a new digital value when a difference of the new digital value to a control value is within a range.

12. The method of claim 11, further comprising:
    computing the control value as an average of a plurality of digital values that are not rejected; and
    generating the control signal with the duty cycle determined according to the control value.

13. The method of claim 8, further comprising at least one of:
    enabling the first PWM signal and the second PWM signal at a some time; and
    disabling the first PWM signal and the second PWM signal at a same time.

14. An apparatus, comprising:
    a first regulator configured to transfer power to a first load when a first pulse width modulation (PWM) signal that drives the first regulator is enabled;
    a second regulator configured to transfer power to a second load when a second pulse width modulation (PWM) signal that drives the second regulator is enabled;
    a switch control circuit configured to enable/disable the first PWM signal to the regulator and to enable/disable the second PWM to the second regulator to transfer power to a second load; and
    a timing control circuit configured to disable an analog to digital converter (ADC) from converting an analog signal to a digital stream in response to the switch control circuit enabling the first PWM signal and the second PWM signal, and configured to enable the ADC to convert the analog signal to the digital stream when the first PWM signal and the second PWM signal are disabled in order to reduce noise in the digital stream due to switching activities in the first regulator and the second regulator.

15. The apparatus of claim 14, wherein the switch control circuit is configured to generate a control signal with a duty cycle determined according to a value in the digital stream and to use the control signal to enable/disable the first PWM signal and the second PWM signal.

16. The apparatus of claim 15, wherein the switch control circuit is configured to generate the control signal with the duty cycle determined according to an average of a plurality of digital values in the digital stream.

17. The apparatus of claim 15, wherein the switch control circuit comprises:
   a duty cycle determination module configured to determine the duty cycle according to a control value; and
   a noise rejection signal configured to reject a new digital value when a difference of the new digital value to the control value within a range.

18. The apparatus of claim 17, wherein the switch control circuit further comprises:
   an averaging module configured to average a plurality of digital values not being rejected to calculate a new control value.

* * * * *